United States Patent [19]
Muehlenhard

[11] Patent Number: 6,097,468
[45] Date of Patent: Aug. 1, 2000

[54] COLLAPSIBLE ZOETROPE

[76] Inventor: William E. Muehlenhard, 1327 E. Palmer St., Philadelphia, Pa. 19125

[21] Appl. No.: 09/143,219

[22] Filed: Aug. 28, 1998

[51] Int. Cl.$^7$ .................................................. G03B 25/00
[52] U.S. Cl. .......................................................... 352/101
[58] Field of Search .......................... 352/101; 206/509, 206/821; 229/114, 5.5, 92.8, 117.01; 446/71, 80; 40/124.08; 428/12, 402

[56] References Cited

U.S. PATENT DOCUMENTS

| | | | |
|---|---|---|---|
| 64,117 | 4/1867 | Lincoln | 352/101 |
| 184,847 | 9/1876 | Curtis | 352/101 |
| 972,344 | 10/1910 | Davis | 352/101 |
| 1,014,365 | 1/1912 | Bourgin | 352/101 |
| 1,214,636 | 2/1917 | Zinn | 352/101 |
| 1,925,136 | 9/1933 | Conover | 352/101 |
| 2,538,407 | 1/1951 | Allen | 352/101 |
| 4,126,265 | 11/1978 | Holmes | 229/32 |
| 4,337,589 | 7/1982 | Volkert et al. | 40/124.08 |
| 4,377,917 | 3/1983 | Guidry | 446/80 |

*Primary Examiner*—Safet Metjahic
*Assistant Examiner*—R. Fuller
*Attorney, Agent, or Firm*—Dann, Dorfman, Herrell and Skillman

[57] ABSTRACT

A collapsible zoetrope having a base and a side wall. The zoetrope is held erect by hinged junctures and mutually engageable tabs and slots between the base and the side wall.

18 Claims, 8 Drawing Sheets

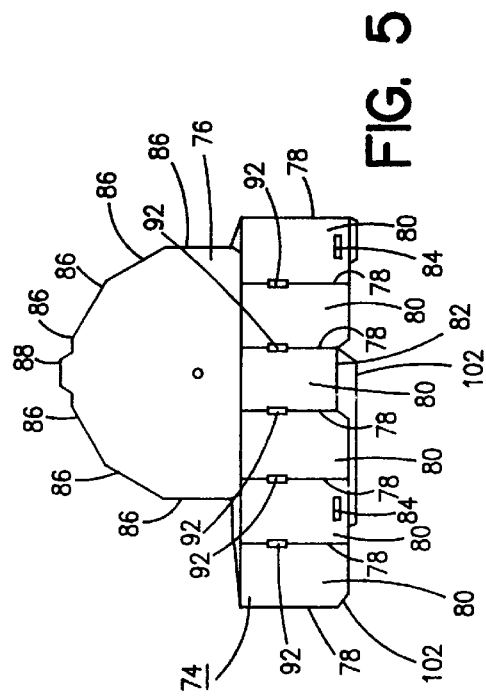
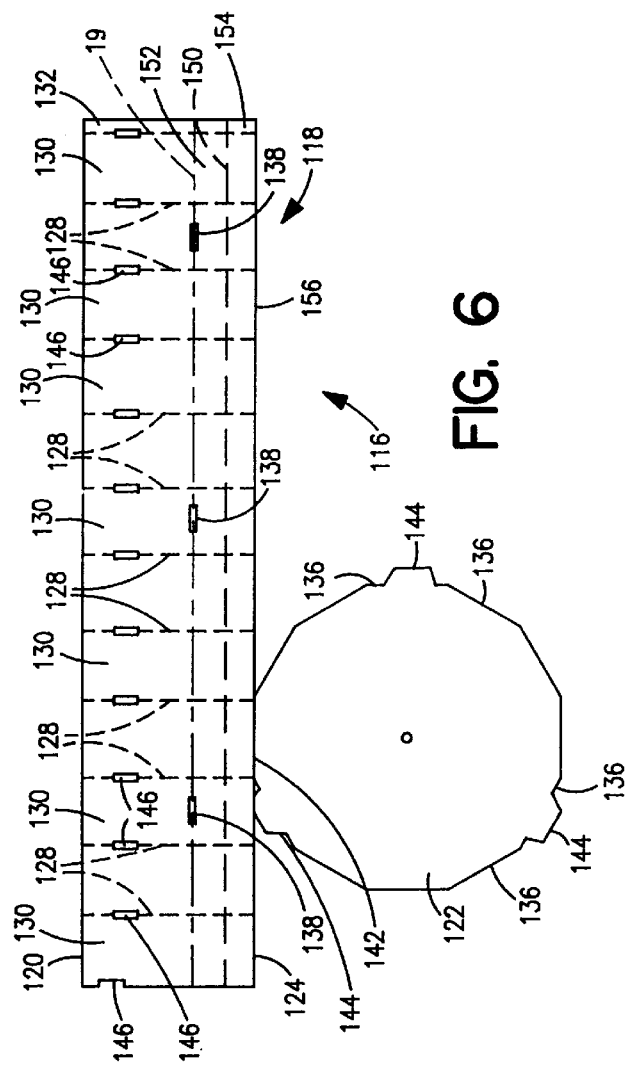

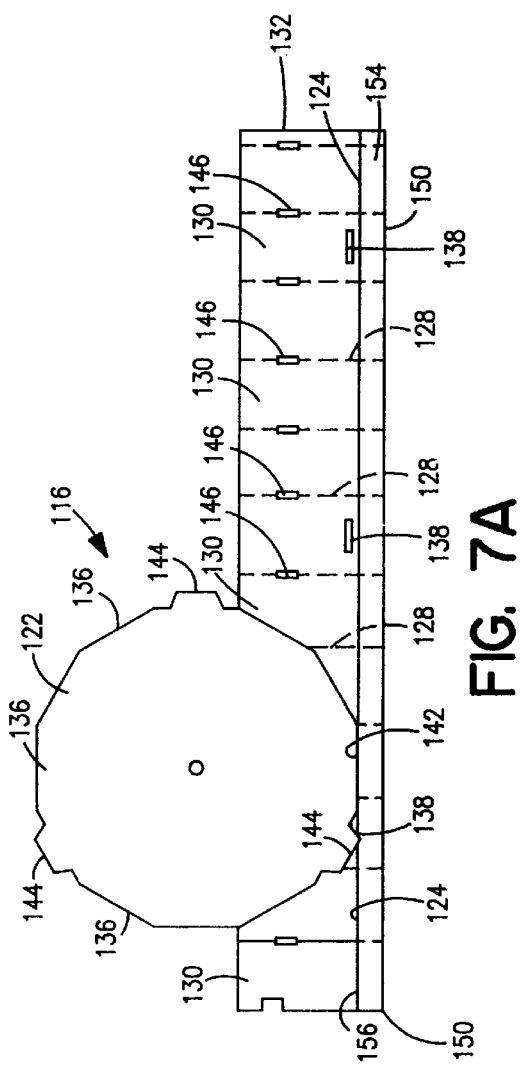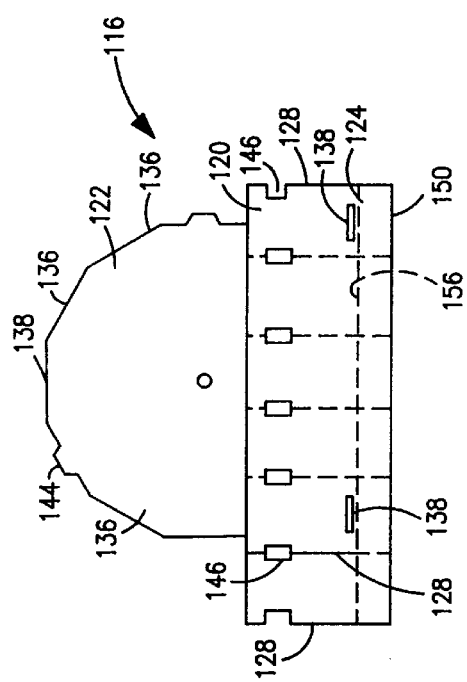

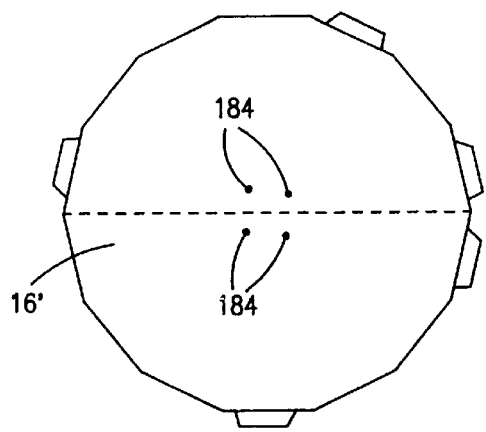
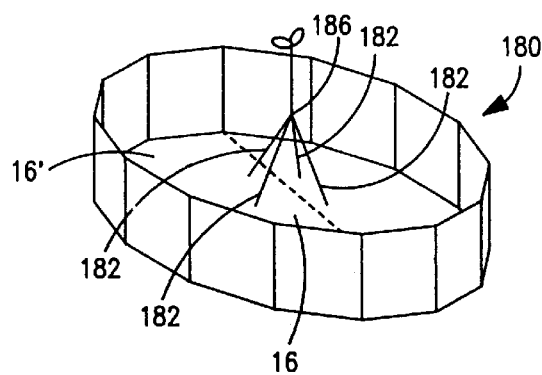
FIG. 10A        FIG. 10B
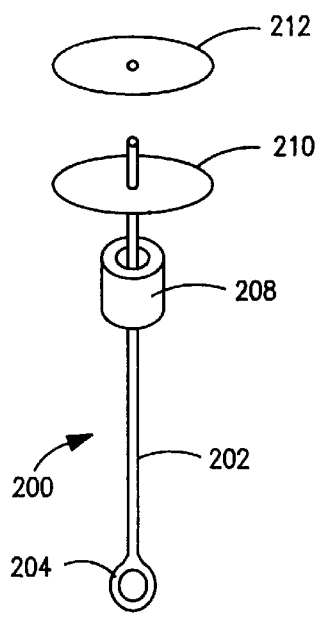
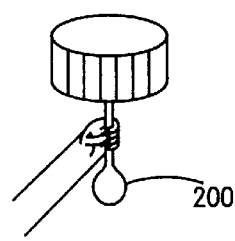
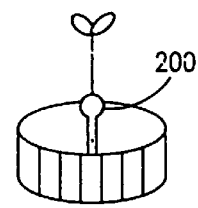
FIG. 11A        FIG. 11B        FIG. 11C

COLLAPSIBLE ZOETROPE

FIELD OF THE INVENTION

This invention relates to a zoetrope and more particularly, to a collapsible zoetrope that can be produced, stored, marketed and distributed in flat form and then be easily and quickly erected for operation by consumers.

BACKGROUND OF THE INVENTION

A zoetrope is a motion picture device providing a mechanical means to display animated imagery by successively revealing and obscuring individual images in a moving series of images. As is well known, a zoetrope comprises a vertically positioned cylindrical wall. The wall is perforated by a series of vertical viewing slits, regularly spaced around its circumference. The interior of the wall provides a surface to support a series of individual images, each comprising an incremental position in the path of movement of a depicted object. When the zoetrope is rotated around the axis passing through its geometric center and running parallel to the viewing slits, the interior surface of the wall may be alternately viewed through the slits and then obscured by the area of wall between the slits. Viewed through the moving series of slits, each successive image of the moving series supported on the interior surface of the wall is revealed as it reaches the same location where the image preceding it had been revealed.

If the zoetrope is rotated at sufficient speed, individual images are revealed for a brief enough period of time that the real motion of the series is imperceptible, and then obscured for a brief enough period of time so that each image persists in the vision of the viewer until replaced by the image following it in the series. Thus, the zoetrope utilizes stroboscopic and thaumatropic effects to make possible the experience of illusory motion.

The first U.S. patent for a zoetrope was issued to William Lincoln, assignor to Milton Bradley & Co. in 1867, (U.S. Pat. No. 64,117). The zoetrope was the most sophisticated and popular motion picture apparatus for several decades, surpassed at the close of the century by Edison's hand-cranked arcade Kinetoscope, and shortly thereafter by theatrically projected movies. The zoetrope remained popular however, and a variety of inexpensive versions of this amusement device have been developed and successfully marketed.

In 1910, 1917, and again in 1933, U.S. patents were issued for zoetropes that could be marketed and distributed as flat kits to be assembled for viewing by consumers. The first U.S. patent for such a zoetrope kit, U.S. Pat. No. 972,344, describes a zoetrope formed from a single rectangular sheet of material that can be cylindrically bent and attached at opposing short ends. Since the cylindrical structure of this zoetrope is maintained only by the elasticity of the sheet material, the wall cannot be folded for packaging and its erect diameter is limited to a dimension equalling less than $\frac{1}{3.14}$ the length of the kit. This severely limits the size of a zoetrope that can be enclosed in an ordinary mailable envelope. Further, the means of erecting this zoetrope necessarily requires overlapping part of the wall, and since no secondary structure reinforces the cylindrical configuration of the erect zoetrope, it will tend not to assume a truly radially symmetrical shape, thus compromising its performance.

The other two patents (U.S. Pat. No. 1,214,636, issued 1910; and U.S. Pat. No. 1,925,136, issued 1933) describe improved kits, both comprising a zoetrope requiring the assembly of two separate pieces of pre-cut sheet material. In both descriptions, one of the pieces is a generally rectangular wall piece that, not unlike the wall piece described in the 1910 patent, must be connected by the consumer at opposing short ends. The other piece is a generally circular base which the consumer can attach to the cylindrical wall through a process of engaging various tabs and slots, thus providing structural stability for the erect drum. The base of the 1993 patent includes a fold line, an improvement which allows for a larger collapsible zoetrope to be enclosed in an ordinary mailable envelope.

Zoetrope kits similar to the ones described in the two later patents are still being marketed today, most commonly as novelty items in museum shops or as devices in science kits used to demonstrate certain principles of optics and sight. The process of assembling both these zoetropes requires a series of coordinated operations, some time and patience, and some glue or other external fastening means.

It would be desirable to have an inexpensive collapsible zoetrope that consumers may easily erect from a flattened form to an operational state in a few seconds without requiring gluing or any other external fastening means. Further, it would be desirable to have a collapsible zoetrope that when erected to operational form has substantially true radial symmetry; one that may be easily and repeatedly collapsed and erected with no substantial loss of operability; and one that may be made of satisfying size when erect and be enclosed in an ordinary envelope when collapsed. Such a zoetrope might alternately be made as small as a Christmas tree ornament or as large as a refrigerator box. Such a zoetrope might be easily stored and distributed, sent through the mail as a greeting card, enclosed in a book or magazine, given away as promotional material, used as a party favor or holiday decoration, incorporated into a kiosk display, or used to display an individual work of animated art. Preferably, the zoetrope should be packaged and sold in a collapsed state while being easily erected to its operating form.

SUMMARY OF THE INVENTION

With the foregoing in mind, the invention relates to a collapsible zoetrope that can be erected to a viewing configuration. The zoetrope comprises a wall which is comprised of foldable material and having an axis of rotation and a fold plane. A plurality of slits is provided in the wall. The slits are at substantially regularly spaced intervals around the side wall and in generally parallel relation to the axis of rotation. The wall includes at least two fold lines. The fold lines are at substantially regularly spaced intervals around the side wall and are in generally parallel relation to the axis of rotation. The interior surface of the wall provides an area to support images. The zoetrope also includes a base. The base of the zoetrope is generally circular or polygonal. The base has a perimeter which comprises an edge, at least one portion of which is connected to at least one portion of the wall. The juncture of the portion or portions of the base with the portion or portions of the wall defines a fold line or fold lines, said fold line or fold lines being substantially parallel to the fold plane. The wall and base of the zoetrope include at least one mutually engagable engagement means, said engagement means being normally disengaged when the zoetrope is collapsed and in mutual engagement when the zoetrope is erect.

In another aspect, the invention relates to a blank for making a collapsible zoetrope that can be erected to a viewing configuration from a sheet of material comprising a base and a wall. The base of the zoetrope is a circle or a polygon with an even number of sides. The wall is a rectangular piece or rectangular pieces with long edges and short ends. At least one portion of the edge of the base includes a juncture with at least one portion of the wall. At least three fold lines are defined by the blank. At least two fold lines are included in the wall, lying perpendicular to the long edges of the wall. At least one fold line is defined by a juncture between the base and the wall, extending parallel to the long edges of the wall. If the blank includes two junctures between the base and the wall, the base may include a fold line extending diametrically across it, substantially parallel to the fold lines defined by the junctures between the base and the wall.

BRIEF DESCRIPTION OF THE DRAWINGS

FIG. 5 is a plan view of a partially assembled zoetrope made from the blank shown in FIG. 4.

FIG. 6 is a plan view of a blank from which a third form of the zoetrope is made.

FIGS. 7A and 7B are plan views of a partially assembled zoetrope made from the blank shown in FIG. 6.

FIGS. 10A and 10B are views of a zoetrope supported by a second support device constructed in accordance with the invention.

FIGS. 11A–11C are views of a zoetrope supported by a third support device constructed in accordance with the invention.

DETAILED DESCRIPTION OF PREFERRED FORMS OF THE INVENTION

Figure 1:
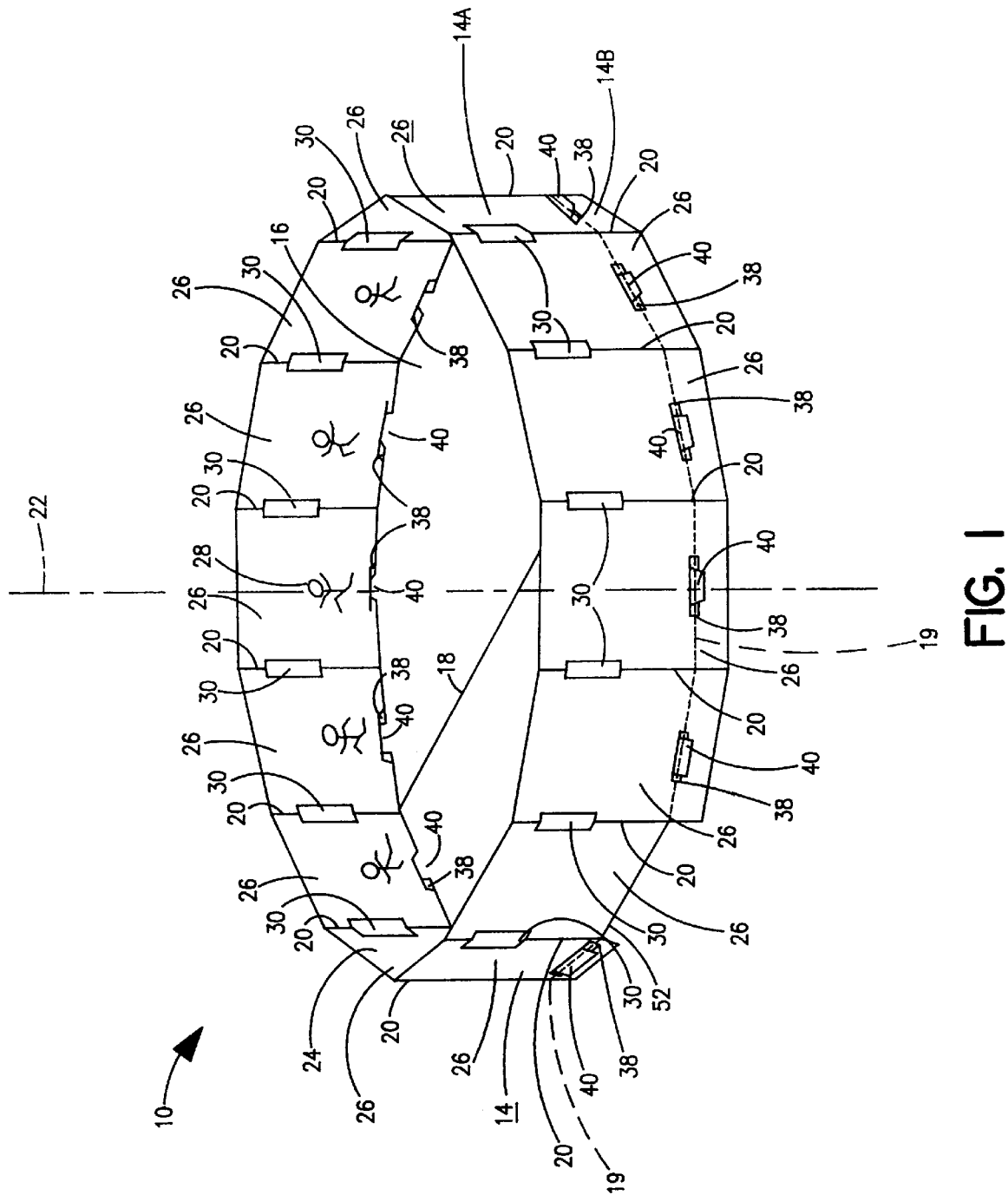
FIG. 1 is a pictorial view of a zoetrope constructed in accordance with one presently preferred form of the invention.

A zoetrope comprising one presently preferred form of the invention is shown in FIG. 1. The zoetrope 10, which may be shipped or sold while packaged in a collapsed state, is shown after it has been erected.

The zoetrope 10 comprises a generally cylindrical side wall 14 comprising a first area 14A and a second area 14B and a base 16 having a diametric fold line 18. The base meets the wall at a line of intersection 19, which divides the wall 14 into first area 14A and second area 14B. The side wall 14 includes a plurality of mutually parallel spaced vertical fold lines 20 that are parallel to the axis 22 of rotation of the cylindrical side wall 14. The inner surface 24 of the first area 14A of the side wall 14 comprises an image supporting area.

The spaces between adjacent vertical fold lines 20 on the side wall 14 comprise wall panels 26. An ordered series of individual images 28, each comprising an incremental position in the movement of an object, are supported on the inner surface 24 of the first area 14A. Further, a plurality of vertically disposed and parallel viewing slits 30 are provided at regular intervals around the side wall 14.

As is well known, when the zoetrope 10 is spun about rotational axis 22 and the images 28 are observed through the viewing slits 30, the object comprising the image appears to move.

As seen in FIG. 1, the wall panels 26 are flat and adjacent wall panels 26 are connected by the fold lines 20 along their opposite long sides. In the form of the invention illustrated in FIGS. 1–3, a viewing slit 30 is located on each fold line 20. However, it should be understood that the viewing slits 30 can be placed in the wall panels 26 if desired.

Further, as seen in FIG. 1, most of the wall panels 26 include a horizontal slot 38 for receiving a tab 40. As will be explained more fully, the tabs 40 are connected to the perimeter of the base 16 and help connect the base 16 to the side wall 14 when the zoetrope is erected.

Figure 2:
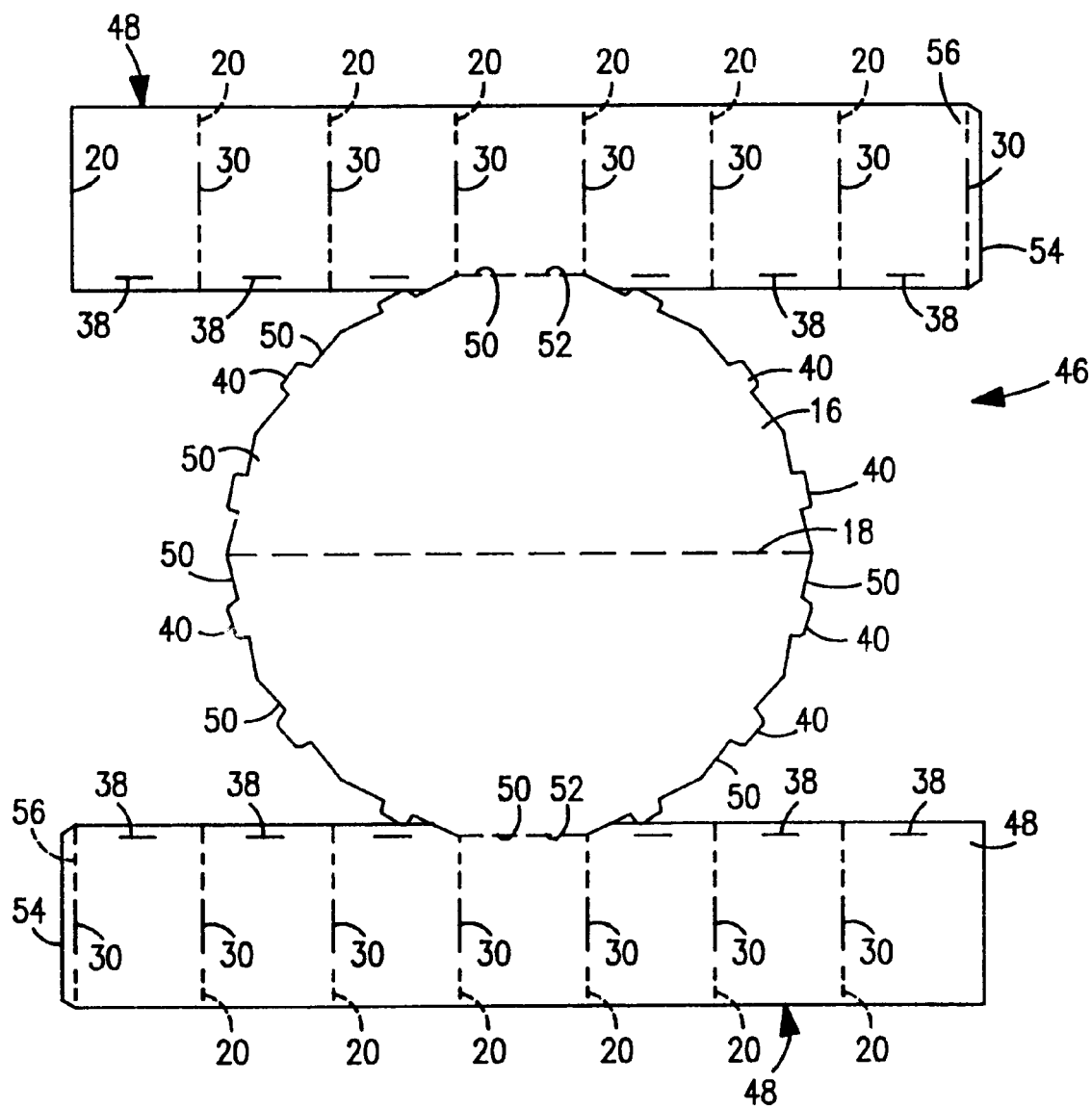
FIG. 2 is a plan view of a blank from which the zoetrope of FIG. 1 is made.

FIG. 2 shows a blank 46 from which the zoetrope 10 is erected. The blank 46 may be made from any suitable flat stock such as stiff paper, thermoplastic, cardboard or sheet metal. The criteria for the selection of a suitable material is that it be relatively inexpensive, that the viewing slits 30 and horizontal slots 38 can be made in it and that it can be easily and accurately cut and folded.

As seen in FIG. 2, the blank 46 is one piece which includes a base portion 16 and wall parts portions 48 which will become the base 16 and the sidewall 14. The base 16 is a regular polygon. The number of sides 50 comprising the perimeter of base 16 is defined by the following equation:

$$(2x+1) \times 2 = \text{number of sides}$$

where x is an integer. While only two of the sides 50 need have radially outwardly extending tabs 40, it is preferred that most of the sides 50 include tabs 40 since this will enhance the structural rigidity of the erected zoetrope.

The juncture of the base 16 with the wall parts 48 is along fold lines 52 which lie along the line of intersection 19, as do the horizontal slots 38.

Preferably, each of the wall parts 48 is a generally elongated rectangular member which may be scored with fold lines 20 or pre-folded to define the wall panels 26. A flap 54 is provided at one end of each of the wall parts 48 and is separated from its respective wall part 48 by a fold line 56. The flaps 54 may be made by forming blank 46 so that at the end of each wall part 48 where the flap 54 is to be located sufficient material is provided so that the wall panel 26 adjacent to it is not shortened and so that there is sufficient space for a viewing slit 30.

The viewing slits 30, the horizontal slots 38, and the fold lines 18, 20, 52 and 56 may be formed when the blank 46 is formed.

As best seen in FIGS. 1 and 2, the zoetrope 10 is assembled by folding the wall parts 48 along the fold lines 20 to define the wall panels 26 and the flaps 54 at the end of the wall parts 48. The blank 46 is then folded along fold lines 18, 52 and 56. This will fold the base 16 over on itself and turn the wall parts 48 up along the base 16. Each of the flaps 54 on each wall parts 48 are then attached to the end of the other wall portion 48 to form the side wall 14.

Figure 3:
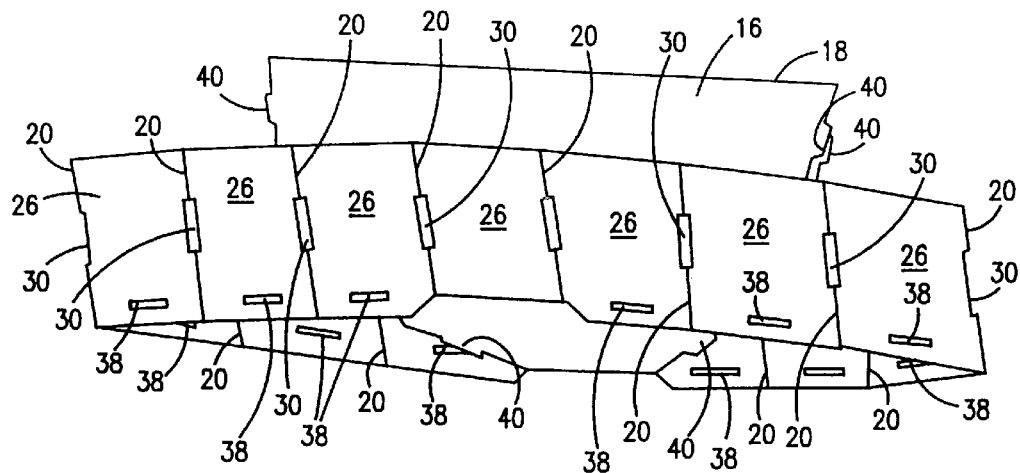
FIG. 3 is a pictorial view of a partially collapsed zoetrope constructed from the blank shown in FIG. 2.

The zoetrope 10 will then be partially assembled as seen in FIG. 3. The partial assembly shown in FIG. 3 can be completely collapsed for storage or shipping, or erected as seen in FIG. 1.

It should be noted that the zoetrope 10 collapses along fold lines 52, diametric fold line 18, and the fold lines 30 in the side wall 14 that are in alignment with the diametric fold line 18. Significantly, folding the zoetrope 10 is possible because with a number of wall panels 26 as defined in the preceding equation, the fold lines 20 where the side wall folds back on itself are aligned with the diametric fold line 18.

If the preceding equation is violated, a wall panel 26 will lie across the diametric fold line 18. As a result, collapse of the zoetrope 10 will not be possible without folding two of the wall panels 26 between the fold lines 20 and damaging them.

On the other hand, the zoetrope 10 can be erected to the form shown in FIG. 1 by simply placing the assembled blank on its edge as illustrated in FIG. 3 and pressing downwardly on the diametric fold line 18. The base 16 will pivot around fold lines 52 and as the base 16 flattens, the tabs 40 will slip into the horizontal slots 38 to retain the zoetrope 10 erect.

The zoetrope 10 can be supported for spinning in a manner which will be described. In this regard it should be observed that most of the mass of the zoetrope 10 is concentrated on the circumference so that the smoothness and length of spin is maximized.

Figure 4:
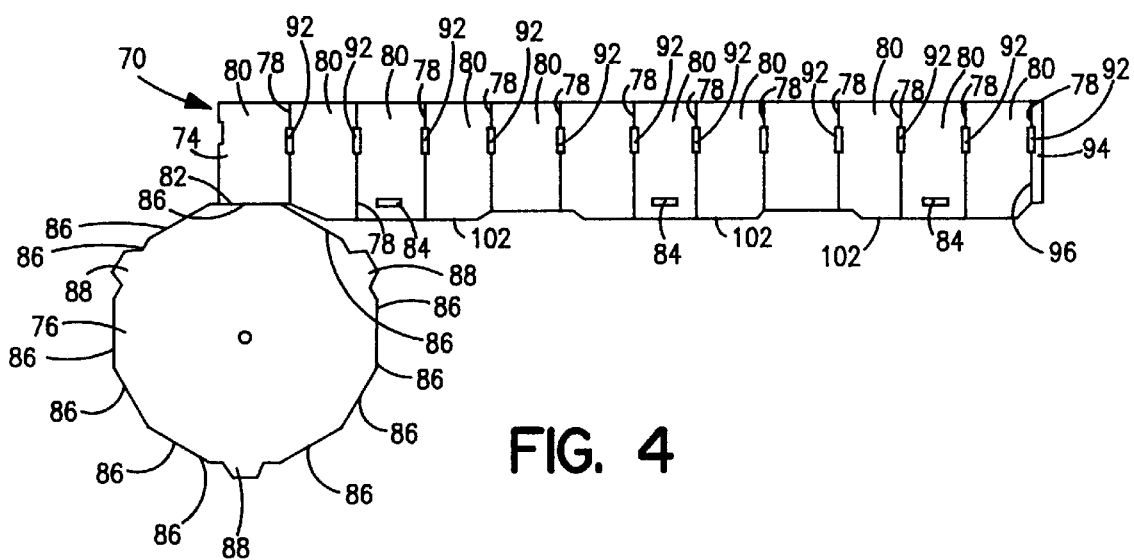
FIG. 4 is a plan view of a blank from which a second form of the zoetrope is made.

In FIG. 4, a zoetrope blank 70 constructed in accordance with a second preferred form of the invention is shown. The blank 70 comprises a wall 74 and a base 76. The wall 74 is divided by regularly spaced parallel fold lines 78 into an even number of wall panels 80. The wall 74 is hingedly connected to base 76 at fold line 82. The wall panels 80 include a plurality of horizontal slots 84. Both the fold line 83 and the horizontal slots 84 lie along the line of intersection 19.

The base 76 is a regular polygon having the same number of sides 86 as there are wall panels 80. While several of the sides 86 of the base 76 should include a radially outwardly extending tab 88, the zoetrope can be erected if only one tab 88 is provided. Preferably, there are the same number of slots 84 as tabs 88.

Preferably, the viewing slits 92 can be at any convenient location on the wall panels 80. However, it is most likely that they will be at the fold lines 78 between adjacent wall panels 80 since if they are at the fold lines 78, it is easier to fold the wall portions without inadvertently creasing the wall panels 80 or missing a fold line 78.

A flap 94 is connected to one end of wall 74 by a fold line 96. The flap 94 is made by forming the blank 70 so that at the end of the wall 74 where the flap 94 is located there is sufficient material so that the wall panel 80 adjacent to it is not shortened and so that there is sufficient space for one of the viewing slits 92.

The horizontal slots 84, the viewing slits 92, and fold lines 78, 82 and 96 may be formed as part of the cutting operation when the blank 70 is formed.

As seen in FIG. 4, the base 76 should have an even number of sides such as the twelve sides shown. As seen in FIG. 4, every fourth side includes one of the outwardly extending tabs 88 which are adapted to be received in the horizontal slots 84 in the wall 74 when the zoetrope 70 is assembled.

The zoetrope 70 of FIG. 4 is assembled by first folding the base 76 along the fold line 82 so that it lies along the wall 74 as seen in FIG. 5. Then, the wall 74 is folded over on itself and flap 94 is attached to the other end of the wall 74. The resulting assembly is illustrated in FIG. 5 where it can be seen that the base 76 lies between the doubled over wall 74.

This form of the invention is erected by simply opening the folded wall 74 and pressing the base 76 into the opening until the tabs 88 on the base 76 slip into horizontal slots 84.

As seen in FIGS. 4 and 5, the wall panels 80 in which the horizontal slots 84 are located are spaced evenly around the base 76 with the fold line 82 being in the same plane as the horizontal slots 84. At a minimum, only one of the other wall panels 80 is required to stop at the plane in which the fold line 82 and the horizontal slots 84 are located to balance the wall panel where the fold line 82 is located. The remaining wall panels that define legs 102 are equally spaced around the base 76, thereby maintaining substantial radial symmetry in the erect zoetrope.

However, since in this preferred form of the invention there are twelve wall panels 80, two other wall panels 80 stop at the plane in which the fold line 82 and the horizontal slots 84 are located to balance the wall panel where the fold line 82 is located. This balance facilitates smooth and even rotation of the zoetrope 10.

Figure 8:
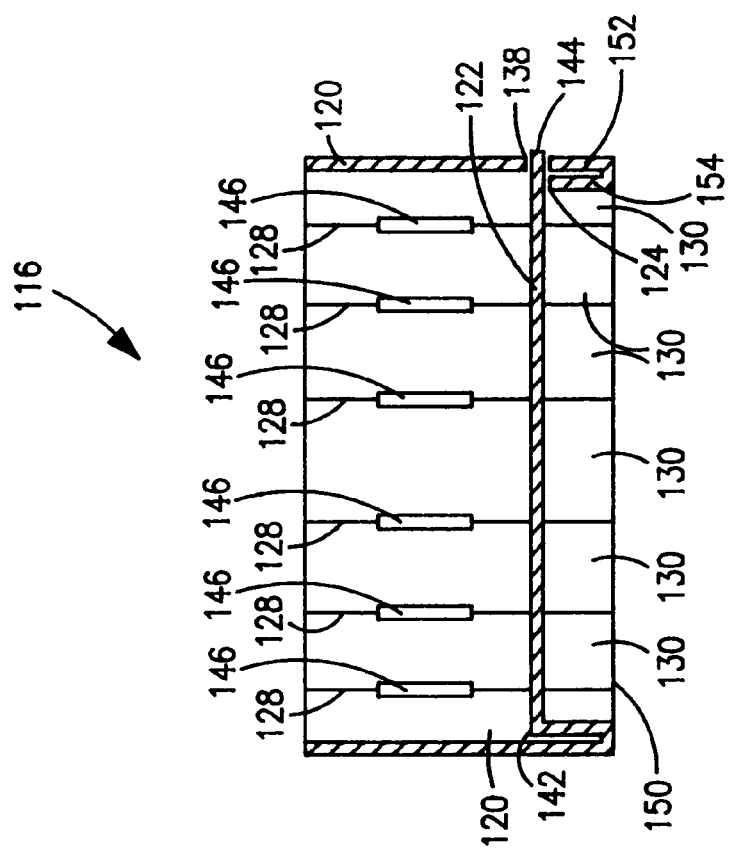
FIG. 8 is a vertical section view of an assembled zoetrope erected from the blank shown in FIGS. 6, 7A and 7B.

A third preferred form of the zoetrope 116 is shown in FIGS. 6–8. In FIG. 6, a blank 118 having a wall 120 and a base 122 is shown. The lower edge 124 of the wall 120 in FIG. 6 is straight. The blank 118 is divided by fold lines 128 into an even number of wall panels 130 and a flap 132.

The base 122 is connected to the wall 120 by fold line 142. The base 122 is a regular polygon having the same number of sides 136 as there are wall panels 130. Some of the sides 136 include outwardly extending tabs 144 for engagement with horizontal slots 138 in wall 120 for supporting the base 122. The wall 120 also includes viewing slits 146.

The blank 118 includes fold line 150 that extends the length of the wall 120 and which is disposed between the base 122 and the line of intersection 19 to divide the second area of 14B into a first portion 152 adjacent to the line of intersection 19 and a second portion 154 which is connected along its edge to the base 122 by fold line 142.

The zoetrope 116 is assembled by first folding the base 122 and the lower portion 154 of the wall 120 at fold line 150 so that they lie along the upper portion 152 of wall 120 with the lower edge 156 of the wall 120 lying just below the line of horizontal slots 138 as seen in FIG. 7A. Then, as seen in FIG. 7B, the wall 120 is folded on itself along one of the fold lines 128 that define the wall panels 130, and the ends of the wall 120 are connected to each other by flap 132 in a manner similar to that which has been described earlier.

The zoetrope 116 will then be partially assembled. The partial assembly can be completely flattened for storage or shipping. On the other hand, the zoetrope 116 can be erected as seen in FIG. 8 by simply opening the wall 120 and pressing downwardly on the base 122 until the tabs 144 that extend from it slip into the horizontal slots 138.

Since the lower edge 124 of wall 120 is now facing upward and is positioned just below the horizontal slots 138, it supports the base 122 around its entire perimeter. Further, since the wall thickness is doubled below the base 122, the smoothness and evenness of rotation of the zoetrope 10 is further enhanced.

Referring now to FIGS. 9–13, several mechanisms for supporting the zoetropes of FIGS. 1, 4 and 6 of the invention so that they can spun freely to enable the images to be viewed in an appropriate manner are shown.

Figure 9:
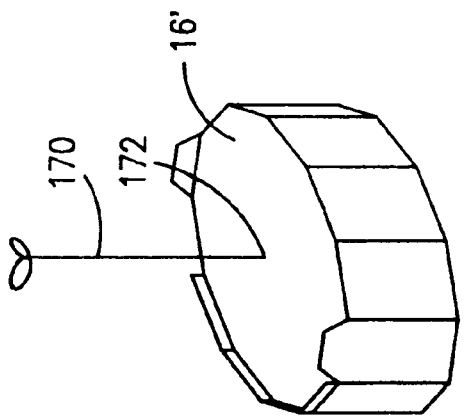
FIG. 9 is a pictorial view of a zoetrope supported by a support device constructed in accordance with the invention.

Thus, in FIG. 9 the zoetrope is shown suspended in an inverted position by an elongated member 170 such as a string, light weight wire or rod which extends through an opening 172 in base 16'. Preferably, a reinforcement such as a washer, flange or other suitable device (not illustrated) is carried by the end of the member to support the weight of the zoetrope.

In FIGS. 10A and 10B the zoetrope is shown while supported by a harness 180 which comprises four members 182. Each of the members 182 which may be comprised of string, light weight wire or rod are connected to the base 16' of the zoetrope at openings 184 which are arranged symmetrically around the center point of the base. The juncture 186 of members 182 is above the center of gravity of the zoetrope so that it will be stable in the illustrated position while spinning.

In FIGS. 11A–11C another support 200 is shown. Support 200 can be used to hold the zoetrope from the bottom as illustrated in FIG. 11B as by hand, or to suspend it as illustrated in FIG. 11C.

As seen in FIG. 11A, the support 200 includes an elongated shaft 202 which can be made from tightly rolled paper, metal, thermoplastic, or other suitable material. It may include a suitable connector such as a ring 204 at one end which can be used to hang or otherwise connect the zoetrope for hanging as seen in FIG. 11C. The support 200 includes a loosely fitting sleeve 208 which is rotatable around the shaft 202. The upper end of shaft 202 extends through an opening in the center of the base of the zoetrope.

Two flanges 210 and 212 are removably fixed to the shaft 202. When the zoetrope is held as shown in FIG. 11B its weight is supported by flange 210 from the underside of the base of the zoetrope. The flange 210, in turn, rests on loosely fitting sleeve 208. The loosely fitting sleeve 208 enables the zoetrope to be spun easily on shaft 202. Flange 212 rests against the top surface of the base of the zoetrope to retain it on the shaft 202.

When the zoetrope is supported as shown in FIG. 11C, the weight of the zoetrope is supported by flange 212 since the base is held between flange 210 and 212.

Figure 12:
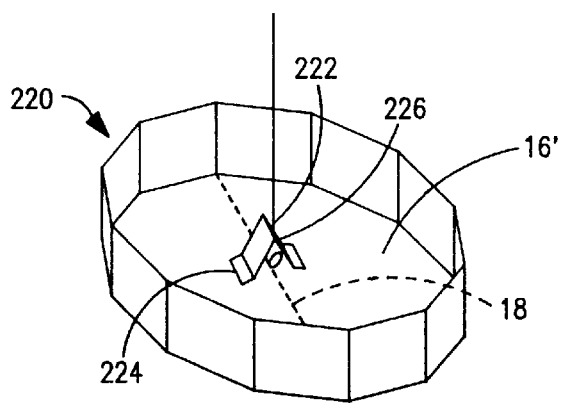
FIG. 12 is a view of a zoetrope supported by a fourth support device constructed in accordance with the invention.

A further form of support 220 is illustrated in FIG. 12. The support 220 includes a cardboard or fabric strip 222 that comprises an elongated generally "V" shaped member having ends 224 and a vertex 226. The ends 224 are attached to the base of the zoetrope so that the vertex 226 lies over the axis of rotation. If the zoetrope has a foldable base such as that shown in FIGS. 1–3, the vertex 226 overlies the diametric fold line so that the support can be collapsed with the zoetrope. The support 220 is of sufficient length so that its connection with member 228 is above the center of gravity of the zoetrope. Support 220 enables the zoetrope to be hung from any convenient item.

Figure 13A:
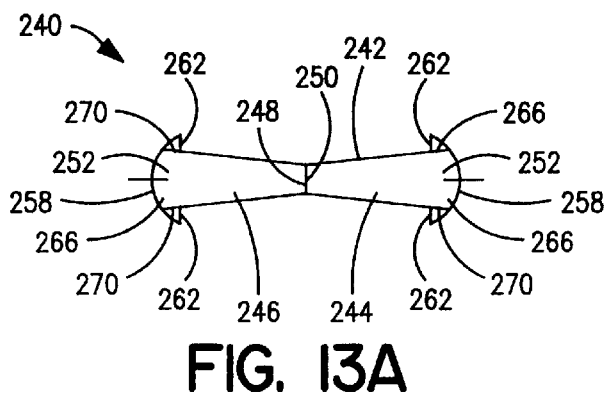
FIGS. 13A and 13B are views of a zoetrope supported by a fifth support device constructed in accordance with the invention.
Figure 13B:
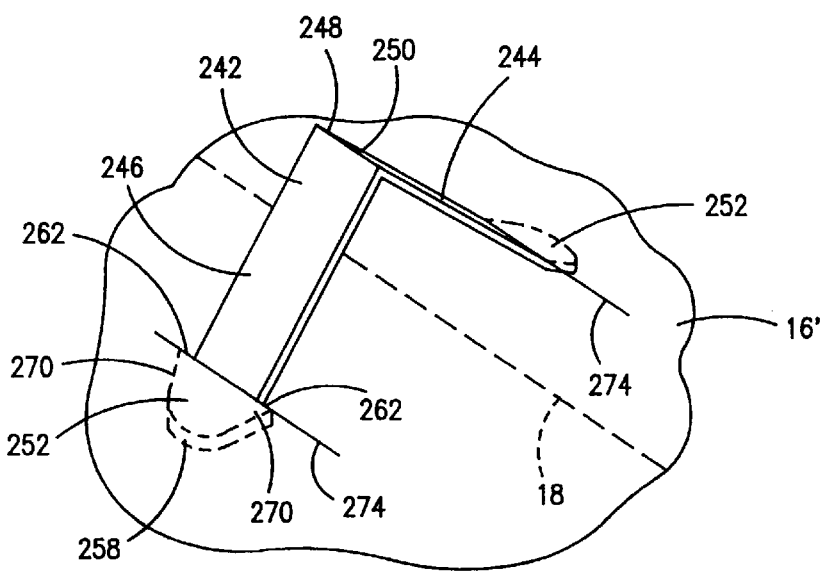

A further form of support 240 is illustrated in FIGS. 13A and 13B. The support 240 which made be made from stiff paper or cardboard comprises a generally "V" shaped member having an elongated central body 242 having sections 244 and 246 which are joined at a vertex defined by transverse fold line 248. The elongated central body includes retainers 252 at each end.

The elongated central body 242 is tapered with its smallest transverse dimension at the transverse fold line 248 and its larger transverse dimension where it meets the retainers 252. A small support hole 250 may be provided at the center of the fold line 248 for receiving a suitable support such as a string, fine wire or rod.

The retainers 252 may be generally semi-circular and have a curved edge portion 258 that extends transversely beyond the elongated central body 242 to define stops 262. Each of the retainers 252 also includes two fold lines 266 which extend generally in the longitudinal direction of the elongated central body 242 to define wings 270.

The support 240 is releasably connected to the base of the zoetrope. In this regard, the base includes two centrally positioned parallel slots 274 which are equidistant from the axis of rotation of the zoetrope. If the base of the zoetrope is foldable such as base 16 shown in FIGS. 1–3, the slots 274 may be parallel to the diametric fold line 18 so that the transverse fold line 248 may overlie it, allowing the support 240 to be collapsed with the zoetrope.

The distance between the fold lines 266 on each of the retainers 252 should be slightly less than the length of the slots 274 so that when the wings are folded about fold lines 266 the retainers can pass through the slots 274. The stops 262 will prevent the retainers 252 from inadvertently coming out of the slots 274.

It should be apparent that the various supports described in FIGS. 9–13 could be used with any of the zoetropes described. Further, each zoetrope could support imagery for viewing while either upright or inverted since the viewing of the wall panels 26, 80 and 130 through their respective viewing slits 20, 92 and 138 is independent of the orientation of the zoetrope.

Further, while the invention has been described with respect to several preferred forms, it is apparent that other forms will be obvious to those skilled in the art. Thus, the scope of the invention should not be limited by the foregoing description, but rather, only by the scope of the appended claims.

What is claimed is:

1. A collapsible zoetrope comprising a blank of sheet material having in one position a flattened form and in a second position an operational erect configuration, said zoetrope comprising a base and a wall, said wall in said erect configuration, having a regular polygonal hollow cylindrical form having planar panels meeting and defining a number of corner angles, said number being defined by the equation 2 times x, where "x" is an odd integer greater than 3, said wall in said erect configuration having radial symmetry around a rotational axis which is mutually parallel with said corner angles, said base in said erect configuration, defining a plane disposed perpendicular to said rotational axis, the intersection of said hollow cylindrical wall and said plane defining a line of intersection around said wall, a first area of said wall lying on one side of said line of intersection and a second area of said wall lying on the opposite side of said line of intersection, said first area having regularly-spaced viewing slits disposed mutually parallel with said rotational axis, said line of intersection having a regular polygonal form defining the perimeter of said base, and having edges and vertices, each edge being parallel to an edge on the opposite side of the base, said base being permanently connected to said wall only along two diametrically opposite edges of said base with hinged connections, the length of each of said hinged connections being no more than the width between vertices along the length of said line of intersection, and being temporarily connected to said wall when in said erect configuration along other edges of said base with releasible connections, said hinged and releasible connections being the only connections between said base and said hollow cylindrical wall, said base including a bisecting fold line parallel to said hinged connections and passing through opposing vertices of said base perimeter, and defining a line passing through two opposing corners of said hollow cylindrical wall when said zoetrope is in said erect configuration, said zoetrope being foldable from said erect configuration to said flattened form by folding along said bisecting fold line and said two opposing corners, and may be erected from said flattened form to said erect configuration by unfolding along said bisecting fold line and said two opposing corners.

2. The collapsible zoetrope of claim 1 in which there is a first area of the wall on the one side of said hinged connections, but no second area of said wall on the opposite side of said hinged connections.

3. The collapsible zoetrope of claim 1 in which said second area of said hollow cylindrical wall has a secondary fold line spaced from and parallel to said line of intersection, and dividing said second area into an upper portion and an lower portion, said lower portion having a free edge spaced from said secondary fold line equal to the spacing of said secondary fold line from said line of intersection, so that when the lower portion is folded inwardly on said secondary fold line, said free edge lies adjacent said line of intersection, and underlies the perimeter of said base when said zoetrope is erected.

4. A zoetrope as defined in claim 1 wherein the number of wall panels is $$(2x+1)[x] \text{ times } 2$$

where x is an integer.

5. A zoetrope as defined in claim 1 wherein
   each of said wall panels lies adjacent to one of said edges of said polygon defined by the perimeter of said base.

6. The collapsible zoetrope of claim 1 wherein said wall and said base are made from paper stock.

7. The collapsible zoetrope of claim 1 wherein said wall and said base are made from cardboard.

8. A blank for making a collapsible zoetrope that can be erected to a viewing configuration from a sheet of material, said blank comprising
   a base and a wall;
   said wall comprising a an even number of rectangular wall panels with long edges and short ends, an image supporting area adjacent one end and a second area adjacent the opposite end, said wall being divided into two parts, and including means to connect the end panels of the two parts together to form a hollow cylindrical wall when the blank is erected, said cylinder having an axis of rotation;
   said base comprising a polygon having an even number of sides corresponding to the number of wall panels,
   said base having two diametrically opposed sides, each including a juncture with a panel of said wall in a separate one of said two parts;
   said junctures of said diametrically opposed sides comprising a base fold line between said base and the associated panel;
   a third base fold line extending diametrically across said base parallel to said juncture fold lines,
   each of said wall parts including a plurality of regularly spaced generally parallel panel fold lines between the panels, said panel fold lines defining the long edges of the panels and having slits therealong, said panel fold lines and slits being perpendicular to said base fold lines, and the distance between said slits being the same as the length of the sides of said polygon.

9. A blank for making a collapsible zoetrope as defined in claim 8 wherein
   each of said wall portions includes a plurality of regularly spaced parallel slits, and the distance between said slits being the same as the length of the sides of said polygon.

10. A blank for making a collapsible zoetrope as defined in claim 9 wherein
    each of said wall portions includes a connector at its end, and
    said connector is connectable to the other wall portion so that said wall will encircle said base when said zoetrope is erected.

11. A blank for making a collapsible zoetrope as defined in claim 9
    each of said wall parts including at least one connection slot, said connection slot being disposed transversely of the axis of rotation of said zoetrope and aligned with said at least two base fold lines, and
    said at least two tabs radiating outwardly from different sides of the polygonal perimeter of said base, each said tab being engagable with a separate one of said connection slots to retain said zoetrope erect when said zoetrope is erected.

12. A blank as defined in claim 11 wherein said base includes an even number of sides, and said wall includes an even number of wall panels.

13. A blank as defined in claim 11 including a connector operative when the zoetrope is erected to be connected to means for supporting said zoetrope for rotation about said axis.

14. A blank as defined in claim 11 wherein said connection slot in each wall part is aligned with a separate one of said at least two base fold lines and defines a line of intersection between said base and said wall part when the zoetrope is erected.

15. A collapsible zoetrope comprising a blank of sheet material having in one position a flattened form and in a second position an operational erect configuration, said zoetrope comprising a base and a wall,
    said wall in said erect configuration, having a regular polygonal hollow cylindrical form having planar panels meeting and defining a number of corner angles, said number being defined by the equation
    2 times x, where "x" is an odd integer greater than 3,
    said wall in said erect configuration having radial symmetry around a rotational axis which is mutually parallel with said corner angles,
    said base in said erect configuration, defining a plane disposed perpendicular to said rotational axis, the intersection of said hollow cylindrical wall and said plane defining a line of intersection around said wall,
    a first area of said wall lying on one side of said line of intersection and a second area of said wall lying on the opposite side of said line of intersection,
    said first area having regularly-spaced viewing slits disposed mutually parallel with said rotational axis,
    said line of intersection having a regular polygonal form defining the perimeter of said base, and having edges and vertices,
    said base being permanently connected to said wall on at least one edge of said base with a hinged connection, the length of said hinged connection being no more than the width between vertices along the length of said line of intersection, and being temporarily connected to said wall along other edges of said base with releasible connections, said hinged and releasable connections being the only connections between said base and said hollow cylindrical wall, said zoetrope being foldable from said erect configuration to said flattened form by unfolding said base along said hinged connection and folding said wall along two opposing corners, and may be erected from said flattened form to said erect configuration by folding said base along said hinged connection and unfolding said wall along said two opposing corners, said second area of said hollow cylindrical wall having a secondary fold line spaced from and parallel to said line of intersection, and dividing said second area into an upper portion and a lower portion, said hinged connection being between said base and said lower portion, said hinged connection being spaced from said secondary fold line equal to the spacing of said secondary fold line from said line of intersection so that when the lower portion is folded inwardly on said secondary fold line, said hinged connection lies adjacent said line of intersection.

16. A collapsible zoetrope that can be erected from a blank comprising a wall and a base, said blank comprising sheet material, said base having a radially symmetrical area selected from the group consisting of circles and regular polygons, said base having an edge describing a circular path when said base is rotated around its geometric center, said wall comprising a rectangular piece having two long edges and two short ends, said long edges the same length as the circumference of said base, said short ends joined to form a continuous loop, said wall including two fold lines arranged parallel to one another and arranged perpendicular to said long edges of said wall and spaced equidistant from each other, defining two identically sized opposing wall portions, said wall collapsible along said fold lines between a flat configuration and an erect three-dimensional configuration with a hollow center having a radially symmetrical cross-sectional area congruent to the shape of said base, said wall and said base joined with at least one hinged connection, said hinged connection having an axis, said axis being parallel to said long edges of said wall and parallel to a tangent of said circular path, said hinged connection located near one edge of a portion of said wall and located adjacent to a portion of the edge of said base, said hinged connection determining an arc of movement of said base relative to said portion of said wall such that when the angle of said arc is 0°, the wall may be collapsed and said base may be disposed between said opposing wall sections, and when said wall is expanded to said three-dimensional configuration and the angle of said arc is 90°, said base is automatically guided inside said hollow center of said wall to a position in which the plane defined by said base is parallel to the planes defined by edges of said wall along a line defined by said axis of said hinged connection, and said base is cinctured by said wall, and said position stabilized by at least one releasable connection between said wall and said base, retaining said zoetrope erect.

17. A zoetrope as defined in claim 16 wherein said base is a regular polygon with an even number of sides and said wall includes the same number of regularly spaced mutually parallel fold lines as said sides, said fold lines defining a plurality of rectangular wall panels, equal in number to said number of sides of said base, and said axis of said hinged connection lies adjacent to one of said sides of said base.

18. A zoetrope as defined in claim 16 wherein said base and said wall are permanently joined with hinged connections at two locations, and said base includes a bisecting fold line dividing said base into two identically sized base sections, said bisecting fold line disposed coplanar with and perpendicular to said two fold lines in said wall, said hinged connections being located on diametrically opposing edges of said base, said hinged connections having axes parallel to said bisecting fold line, each axis of said hinged connections determining an arc of movement of said base sections relative to its adjacent wall portions, and the axis of said bisecting fold line determining an arc of movement of said base sections relative to one another such that the angles of both said arcs of said hinged connections are always equal to each other, and the angle of said arc made by said base sections to one another is always the sum of said angles made by said hinged connections, when said angle made by said base sections equals 180° and said angles made by both said hinged connections equal 90°, said base is disposed coplanar with both hinged connections and the zoetrope is erect, and when angles made by the base sections the hinged connections equal 0°, the zoetrope is flat, and at least two mutually engageable engagement means operable to automatically engage said base with said wall, maintaining the zoetrope erect.

* * * * *